United States Patent [19]

Hudson

[11] Patent Number: 5,540,119
[45] Date of Patent: Jul. 30, 1996

[54] CAM-ACTUATED CLUTCH DIFFERENTIAL DRIVE ASSEMBLY

[76] Inventor: John L. Hudson, 717 Fore Rd., Florence, S.C. 29506

[21] Appl. No.: 312,809

[22] Filed: Sep. 27, 1994

[51] Int. Cl.[6] ............................................. F16H 48/14
[52] U.S. Cl. ........................ 74/650; 192/49; 192/93 A
[58] Field of Search ........................... 74/650; 192/48.8, 192/49, 50, 18 A, 87.16, 93 A; 475/224

[56] References Cited

U.S. PATENT DOCUMENTS

| | | | |
|---|---|---|---|
| 2,060,558 | 11/1936 | Lavaud | 74/650 |
| 2,179,923 | 11/1939 | Lavaud | 74/650 |
| 3,088,552 | 5/1963 | Christenson et al. | 192/18 A |
| 3,971,461 | 7/1976 | Conroy et al. | 192/18 A |
| 4,096,931 | 6/1978 | Whitehurst | 192/18 A |
| 4,785,926 | 11/1988 | Matson | 192/18 A |
| 4,867,009 | 9/1989 | Hudson . | |
| 5,383,378 | 1/1995 | Paul et al. | 74/650 |

OTHER PUBLICATIONS

Harold A. Rothbart, ed., *Mechanical Design and Systems Handbook*, pp. 38.83 through 38.84 (2nd ed. 1985).
Eugene A. Avallone and Theodore Baumeister, III, eds., *Marks' Standard Handbook for Mechanical Engineers*, pp 11–10 through 11–11 (9th ed. 1987).
Dennis P. Townsend, ed., *Dudley's Gear Handbook*, pp. 3.26 through 3.30 (2nd ed. 1991).

*Primary Examiner*—Rodney H. Bonck
*Assistant Examiner*—Sherry Estremsky
*Attorney, Agent, or Firm*—Dority & Manning

[57] ABSTRACT

A differential drive assembly for differentially transferring rotational power from a source of input power to a pair of output shafts without the use of internal gears. The assembly includes a drive member adapted to be rotatably driven by the source of input power. First and second auxiliary members are provided, each having an inner face located in opposition to a respective planar face of the drive member. The auxiliary members are rotatably and axially moveable with respect to the drive member over a predetermined range. First and second clutch assemblies, preferably constructed of a plurality of interleaved frictional plates, are selectively engageable by movement of the auxiliary members to transfer the rotational power from the drive member to an associated output shaft. Cam mechanisms are provided to axially move a respective auxiliary member such that engagement of a respective clutch assembly may be selectively effected. In some exemplary constructions, each of the cam mechanisms comprises one or more radially disposed roller members rotatably carried by the drive member. Each such roller member is received in a cam indentation defined in the associated auxiliary member. A coordinator member rotatably extends through the drive member and interconnects the auxiliary members to generally prevent more than a predetermined relative rotation therebetween. Multiple of the differential drive assemblies of the invention may be provided in a vehicle drive train to provide full-time four wheel drive.

18 Claims, 9 Drawing Sheets

CAM-ACTUATED CLUTCH DIFFERENTIAL DRIVE ASSEMBLY

BACKGROUND OF THE INVENTION

The present invention relates in general to an improved differential drive assembly. More particularly, the present invention relates to an improved differential drive assembly which differentially transfers rotational power from a drive member to output shafts on either side thereof without the use of differential gears.

Differential drive assemblies, or more simply mechanical differentials, are utilized in many applications in which it is desired to allow a common rotational input to be differentially transferred between two rotational outputs. For example, a "differential" may be placed between the rear wheels of a rear wheel drive automobile to differentially transfer rotational power from the vehicle's drive shaft to each of the two rear axles.

One type of differential used for this purpose is commonly referred to as a "gear-type" differential. Gear-type differentials are generally very efficient on surfaces that provide good traction, such as pavement or dry dirt. They are not, however, particularly efficient on surfaces that provide poor traction, such as snow, ice or mud. If one wheel loses traction and begins to spin freely, all drive motion is lost through the spinning wheel. In this case, the vehicle may become immobilized due to the lack of traction of the spinning wheel (even though the nonslipping wheel may have sufficient traction). Because substantially all of the driving motion from the drive shaft is transferred to the spinning wheel, the other wheel will generally not receive sufficient rotational power to mobilize the vehicle.

Another type of differential, commonly referred to as a limited slip or positive traction differential, is a modification of the gear-type differential. Small clutches are typically placed outboard of each differential gear to provide some degree of binding between the differential gear and the associated output shaft. Differentials of this type, however, have often not transferred sufficient power to a tractional wheel to prevent a vehicle from becoming immobilized. Additionally, the binding caused by this construction may contribute to tire tread wear.

SUMMARY OF THE INVENTION

The present invention recognizes and addresses various of the foregoing drawbacks, and others, concerning differential drive assemblies. Thus, broadly speaking, one main object of the present invention is to provide an improved differential drive assembly.

It is another principle object of the present invention to provide an improved positive traction drive assembly which receives a rotational input and differentially delivers therefrom two rotational outputs.

It is a more particular object of the present invention to provide an improved differential drive assembly which receives a rotational input and delivers therefrom two rotational outputs without the use of internal gears.

It is a further object of the present invention to provide an improved differential drive assembly in which one output shaft may rotate faster than the central drive member, but cannot rotate slower than the central drive member.

It is another object of the present invention to provide an improved differential drive assembly which may be utilized in combination with gear-type differentials to provide full time positive power at front and rear drive shafts.

It is a further object of the present invention to provide an improved differential drive assembly which may be utilized in combination with other differential drive assemblies of the invention to provide full time four-wheel drive with positive traction at all four wheels of a vehicle.

Additional objects and advantages of the invention are set forth in, or will be apparent to those of ordinary skill in the art from, the detailed description which follows. Also, it should be further appreciated that modifications and variations to the specifically illustrated and discussed features or materials hereof may be practiced in various embodiments and uses without departing from the spirit and scope of the invention. Such variations may include, but are not limited to, substitution of equivalent means and features or materials for those shown and described, and the functional or positional reversal of various parts, features, or the like. Still further, it is to be understood that different embodiments, as well as different presently preferred embodiments, of the present invention may include various combinations or configurations of presently disclosed features or elements, or their equivalents (including combinations or configurations thereof not expressly shown in the drawings or discussed herein).

An exemplary embodiment of the present invention relates to a differential drive assembly having a drive member adapted to be rotatably driven by a source of input power. The drive member includes respective first and second planar faces. First and second output shafts are disposed along an axis of rotation of the drive member on respective opposite sides thereof. The differential drive assembly further includes first and second auxiliary members, each having an inner face located in opposition to a respective planar face of the drive member. The auxiliary members are rotatably and axially moveable with respect to the drive member over a predetermined range.

The differential drive assembly further includes first and second clutch assemblies, each including at least one first frictional member connected to a respective output shaft. Each of the clutch assemblies also includes at least one second frictional member connected to a respective auxiliary member. First and second cam mechanisms are provided to axially move a respective auxiliary member such that engagement of a respective clutch assembly may be selectively effected. As a result, rotational power may be differentially transmitted from said drive member to respective of said first and second output shafts.

In some presently preferred embodiments, each of the cam mechanisms comprises at least one cam follower carried by one of the drive member and a respective auxiliary member. Such a cam follower is preferably received in a respective cam indentation defined in the other of the drive member and the auxiliary member which does not carry the cam member.

In an exemplary construction, each cam follower is carried by the drive member and the associated cam indentation is defined in the inner face of a respective auxiliary member. Preferably, the cam follower may be constructed in this case as a radially disposed roller member rotatably carried by the drive member. The cam indentation receiving such a roller member preferably includes first and second sloped surfaces extending into the respective auxiliary member to a radially extending apex.

In an exemplary construction, each of the cam mechanisms may include four (4) of the radially disposed roller members and associated cam indentations. The differential drive assembly may further comprise a coordinator member rotatably extending through the drive member and interconnecting the auxiliary members to allow only a predetermined range of relative rotation therebetween.

The clutch assemblies are preferably constructed having a plurality of frictional plates interleaved along the axis of rotation of the drive member. Some of such frictional plates may be maintained by a generally cylindrical plate carrier connected to a respective output shaft. Alternating plates may be maintained by a cylindrical plate carrier portion integrally extending from a respective auxiliary member in an outward axial direction. First and second clutch backing members may also be provided, each having a cylindrical plate carrier portion integrally extending in an inward axial direction to maintain additional alternating plates.

In presently preferred embodiments, the differential drive assembly further comprises a rotatable differential housing fixedly secured to the drive member and rotatably supporting the output shafts. Preferably, the differential drive assembly further includes a fixed outer differential housing inside of which the rotatable housing is maintained. The drive member may include a ring gear mounted about a circumference thereof to engage a drive gear operatively connected to the source of input power.

At least one axially projecting drive pin may extend from one of the differential housing and a respective backing member. Such drive pins may be received in drive slots defined in the other of the differential housing and the backing member which does not have the drive pins. The drive slots are preferably configured to permit rotational movement of the backing member with respect to the differential housing over a predetermined range.

In some applications, for example, where brake assisted turning is desired, means of disconnecting the output shafts from a respective vehicle axle may be provided. Thus, some presently preferred embodiments of the invention are further equipped with first and second axle brake mechanisms. Such axle brake mechanisms are preferably operative such that a respective output shaft and an associated axle normally operate as a unit. Selective actuation of each such axle brake mechanism functions to disengage the respective output shaft from the associated axle while concurrently providing axle braking.

In an exemplary construction, each of the axle brake mechanisms includes a fluid-actuated piston connected to a first carrier maintaining at least one frictional plate. The piston and first carrier may be mounted coaxial to the associated axle. Actuation of the piston provides engagement between frictional plates carried by the first carrier and frictional plates carried by one of a second carrier connected to the respective output shaft and a third carrier mounted to a fixed housing. Preferably, the axle brake mechanisms each include a spring for providing the normal unitary operation of a respective output shaft and the associated axle. The spring may be a helical spring mounted coaxially of the fluid-actuated piston.

Those of ordinary skill in the art will better appreciate the features and aspects of various embodiments of the present invention upon review of the remainder of the specification.

BRIEF DESCRIPTION OF THE DRAWINGS

A full and enabling disclosure of the present invention, including the best method thereof, directed to one of ordinary skill in the art, is set forth in the remainder of the specification, which makes reference to the appended drawings, in which.

Repeat use of reference characters throughout the present specification and appended drawings is intended to represent same or analogous features or elements of the invention.

DETAILED DESCRIPTION OF THE PREFERRED EMBODIMENTS

Reference will now be made in detail to the presently preferred embodiments of the invention, which are fully illustrated in the accompanying drawings. Such presently preferred embodiments are provided by way of explanation of the invention, not limitation of the invention. In fact, it will be apparent to those skilled in the art that various modifications and variations can be made thereto. For example, features illustrated or described as part of one embodiment can be used on another embodiment to yield a still further embodiment. Additionally, certain features may be interchanged with similar devices or features not mentioned yet which perform the same or similar function.

As discussed above, the present invention is particularly concerned with providing an improved differential drive assembly, along with various uses thereof. Thus, referring now to FIG. 1, an improved differential drive assembly of the present invention is indicated generally at 10. As can be seen, assembly 10 is installed between the rear wheels 12 and 14 of a rear-wheel-drive vehicle 16. As with a conventional differential, assembly 10 receives input power from the vehicle's drive shaft 18. Typically, drive shaft 18 may be equipped with a U-joint, such as U-joint 20.

Figure 1:
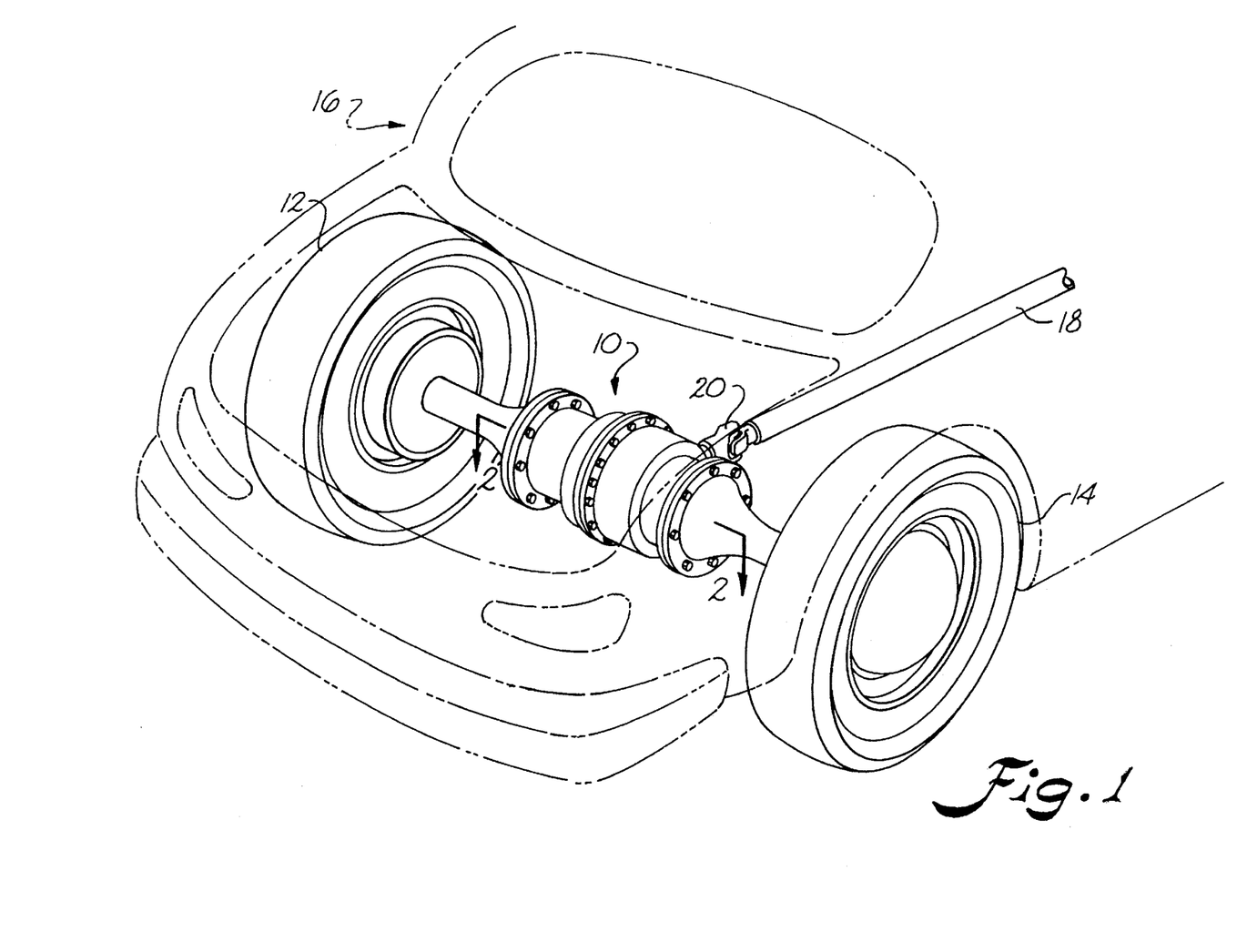
FIG. 1 is a perspective view illustrating a differential drive assembly of the present invention installed in a rear wheel drive vehicle.

The input power supplied by drive shaft 18 is differentially transferred by assembly 10 to wheels 12 and 14, as desired. As used herein, the term "differentially transferred" signifies that one of wheels 12 and 14 may rotate at a faster rotational speed than the other when such faster rotation is necessary, as during turning. Unlike gear-type differentials discussed above, however, assembly 10 is configured so that neither of wheels 12 and 14 may rotate at a rotational speed slower than the other. If one wheel experiences a loss of traction, power will continue to be delivered to the other wheel. As a result, vehicle 16 will not become immobilized, assuming the other wheel continues to have sufficient traction.

Figure 2:
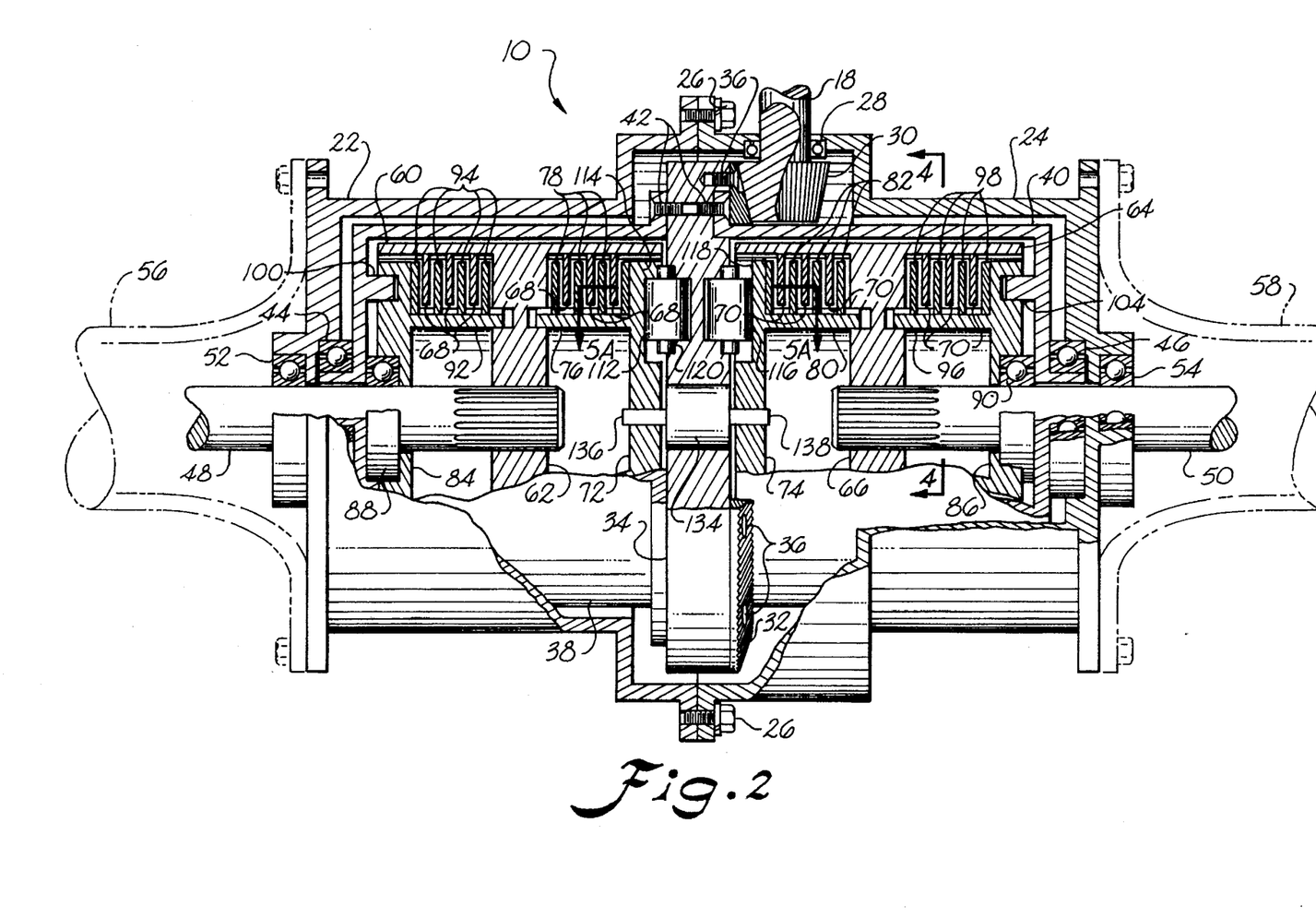
FIG. 2 is a partial cross sectional view as taken along lines 2—2 of FIG. 1.
Figure 3:
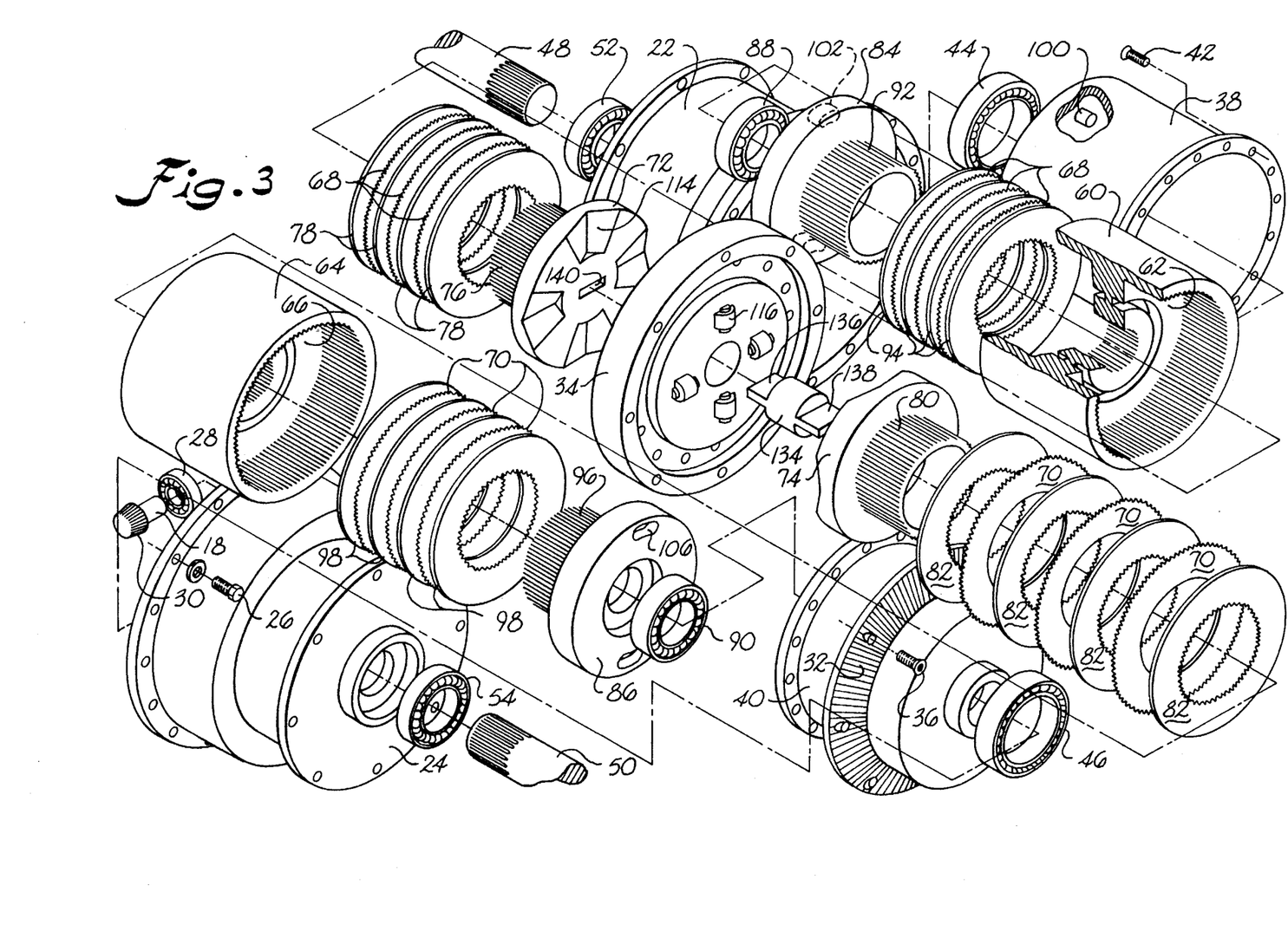
FIG. 3 is an exploded view of the differential drive assembly of FIG. 1.

Referring to FIGS. 2 and 3, the construction of assembly 10 may be most easily explained. Assembly 10 includes an outer housing which is fixed with respect to the particular foundation, such as vehicle 16, into which it is installed. In the illustrated embodiment, this outer housing includes two housing portions 22 and 24 which are mated as shown. Housing portions 22 and 24 may be maintained together by bolts, such as bolts 26, or any other suitable attachment means.

Drive shaft 18 extends through housing portion 24 and is rotatably supported therein by a bearing assembly 28. A pinion 30 mounted to the end of drive shaft 18 engages a ring gear 32 attached to a central drive member 34. Ring gear 32 is shown attached by bolts, such as bolts 36, but other appropriate means of attachment may also be utilized. It can thus be seen that rotation of drive shaft 18 will cause rotation of drive member 34.

Assembly 10 further includes an inner housing configured for rotation with respect to the outer housing. In the illustrated embodiment, the inner housing includes housing portions 38 and 40, each of which is attached to drive member 34 via bolts 42 or other appropriate means of attachment. Rotation between the inner housing and the outer housing may be facilitated by bearings assemblies 44 and 46.

Respective output shafts 48 and 50 extend along the axis of rotation of drive member 34 on opposite sides thereof. Shaft 48 is supported for rotation with respect to housing portion 22 by bearing assembly 52. Similarly, bearing assembly 54 rotatably supports drive shaft 50 in housing portion 24. In a typical rear-wheel-drive vehicle, such as vehicle 16, drive shafts 48 and 50 may directly extend to the respective rear wheels. It may often be desirable to encase the drive shafts 48 and 50 in respective axle sheaths 56 and 58, as shown.

As described above, assembly 10 functions to differentially transfer input power to output shafts 48 and 50. Toward this end, each of output shafts 48 and 50 has a clutch assembly associated therewith. Each clutch assembly includes frictional members, engagement of which causes output power to be transferred from drive member 34 to the associated of output shafts 48 and 50. When the frictional members are disengaged, the respective of output shafts 48 and 50 will be permitted to rotate at a speed exceeding that of drive member 34.

In the illustrated embodiment, the clutch assemblies are each constructed as a plurality of frictional plates interleaved along the axis of rotation of drive member 34. Toward this end, the clutch assembly to the left of drive member 34 in FIG. 2 includes a generally cylindrical plate carrier 60. A web portion 62 integrally extends from plate carrier 60 in an inward radial direction. Web portion 62 defines therein a bore into which an end of output shaft 48 is received. As shown, longitudinal splines which are spaced about shaft 48 at this location engage complementary splines defined in the bore of web portion 62. Such splines permit some axial movement of plate carrier 60 while preventing rotational movement thereof.

In a similar manner, the clutch assembly to the right of drive member 34 in FIG. 2 includes a cylindrical plate carrier 64. A web portion 66 extends in a radially inward direction from plate carrier 64. Web portion 66 defines a bore into which a spline end of output shaft 50 is received as described above. Plate carriers 60 and 64 maintain a plurality of frictional plates, as indicated by the reference numbers 68 and 70, respectively.

Assembly 10 further includes a pair of auxiliary members 72 and 74 maintained proximate respective planar faces of drive member 34. Auxiliary member 72 includes a cylindrical plate carrier portion 76 integrally extending in an axial direction outward of drive number 34. A plurality of frictional plates 78 are maintained by plate carrier 76 and interleaved with some of plates 68, as shown. Similarly, auxiliary member 74 has integrally mounted thereon a cylindrical plate carrier portion 80. Plate carrier portion 80 maintains a plurality of frictional plates 82 interleaved with some of plates 70. Note that radial web portions 62 and 66 each define an annular recess for receiving therein a portion of the respective plate carrier portions 76 and 80.

In the illustrated embodiment, assembly 10 further includes respective clutch backing members 84 and 86. Preferably, output shafts 48 and 50 are rotatably supported as they extend through respective of backing members 84 and 86 by bearing assemblies 88 and 90, respectively. Backing member 84 includes a cylindrical plate carrier portion 92 integrally extending in an inward axial direction towards drive member 34. Plate carrier portion 92 maintains thereon a plurality of frictional plates 94 which are interleaved with some of plates 68, as shown. Similarly, backing member 86 includes a cylindrical plate carrier portion 96. Plate carrier portion 96 maintains thereon a plurality of frictional plates 98, which are interleaved with some of plates 70. As shown, annular recesses are also provided in radial web portions 62 and 66 for receiving therein a portion of plate carrier portions 92 and 96, respectively.

To facilitate release of the respective clutch assemblies after engagement of the frictional plates, assembly 10 is configured such that each of the clutch assemblies will rotate a predetermined distance with respect to the inner housing before being engaged thereby. In this regard, housing section 38 includes at least one, and preferably several, inwardly extending drive pins, such as drive pin 100. Drive pin 100 is received in a slot defined in clutch backing member 84, as shown. As can be seen most clearly in FIG. 3, this slot, indicated at 102, preferably has an oblong configuration to permit the desired relative rotation. Similarly, housing portion 40 preferably includes one or more inwardly extending drive pins, such as drive pin 104, received in oblong slots defined in clutch backing member 86, such as slot 106.

Figure 2A:
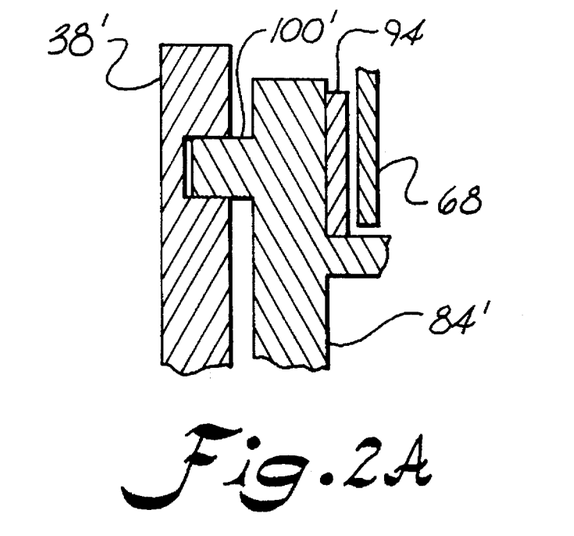
FIG. 2A is an enlarged view illustrating an alternative arrangement of the drive pins and corresponding receiving slots.

As shown in FIG. 2A, the drive pins and corresponding slots may be reversed. Specifically, FIG. 2A illustrates a drive pin 100' attached to a clutch backing member 84'. Drive pin 100' is received in a corresponding slot in the wall of housing section 38'. A similar arrangement may, of course, be provide for the opposite clutch assembly.

Figure 4:
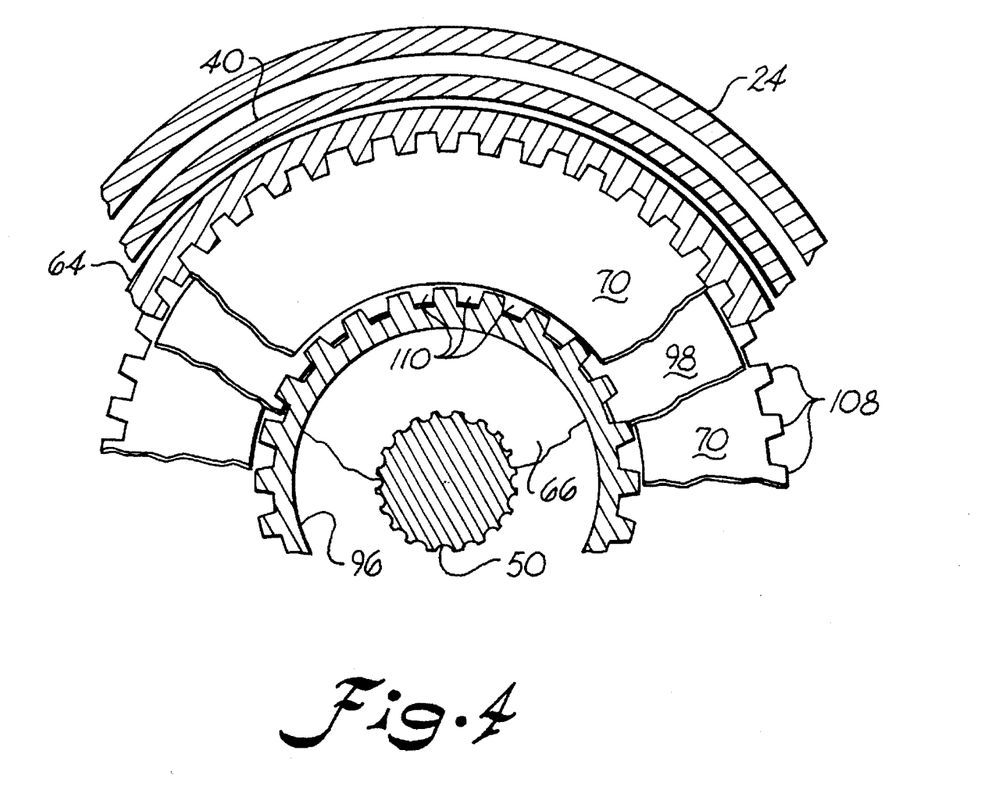
FIG. 4 is a partial cross sectional view as taken along lines 4—4 of FIG. 2.

The manner in which the various frictional plates are maintained by the respective plate carrier is shown in FIG. 4. As can be seen, frictional plates 70 define a plurality of tooth members 108 about their outer circumference. Tooth members 108 are received by complementary longitudinal grooves defined in an inner circumferential surface of plate carrier 64. Similarly, frictional plates 98 define a plurality of tooth members 110 about their inner circumference which are received by longitudinal grooves defined in an outer circumferential surface of plate carrier portion 96.

Other of the frictional plates, as well as their respective carriers, are constructed in a similar manner. This construction prevents the frictional plates from rotating with respect to their carrier, but allows some axial movement thereof. As a result, engagement and disengagement of the plates may be easily effected. Additionally, this construction facilitates assembly of the clutch assembly by alternately stacking the interleaved plates.

Selective engagement of each clutch assembly is accomplished utilizing a respective cam mechanism. Specifically, cam mechanisms are provided to selectively move respective of auxiliary members 72 and 74 over a limited axial distance. It will be appreciated that, as auxiliary members 72 and 74 are moved in an outward axial direction, frictional plates of the respective clutch assembly are urged into engagement. As a result, rotational power will be transferred from drive member 34 to the respective of output shafts 48 and 50. On the other hand, movement of auxiliary members 72 and 74 in an inward axial direction will cause disengagement of the frictional plates. This permits the respective of drive shafts 48 and 50 to rotate at a speed faster than drive member 34 when necessary.

In the illustrated embodiment, each of the cam mechanisms comprises at least one radially disposed roller member rotatably carried by each of the respective planar faces of drive member 34. Each such roller member is received in a cam indentation defined in the inner surface of the respective of auxiliary members 72 and 74. For example, roller member 112 is received in a cam indentation 114 defined in the inner surface of auxiliary member 72. Similarly, roller member 116 is received in a cam indentation 118 defined in the inner face of auxiliary member 74. As shown, the respective roller members are supported for at least limited rotation with respect to drive member 34 by axle pins, such as axle pin 120 of roller member 112. As can best be seen in FIG. 3, presently preferred embodiments are constructed having four (4) radially disclosed roller members on each of the planar surfaces of drive member 34.

Figure 5A:
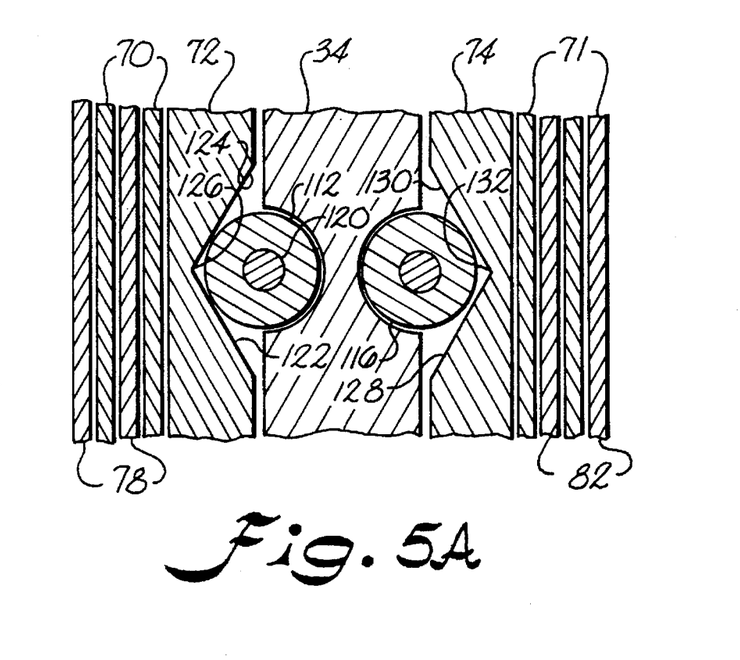
FIG. 5A is a partial cross sectional view as taken along lines 5A—5A of FIG. 2 illustrating a preferred cam mechanism for use with the differential drive assembly of the present invention.
Figure 5B:
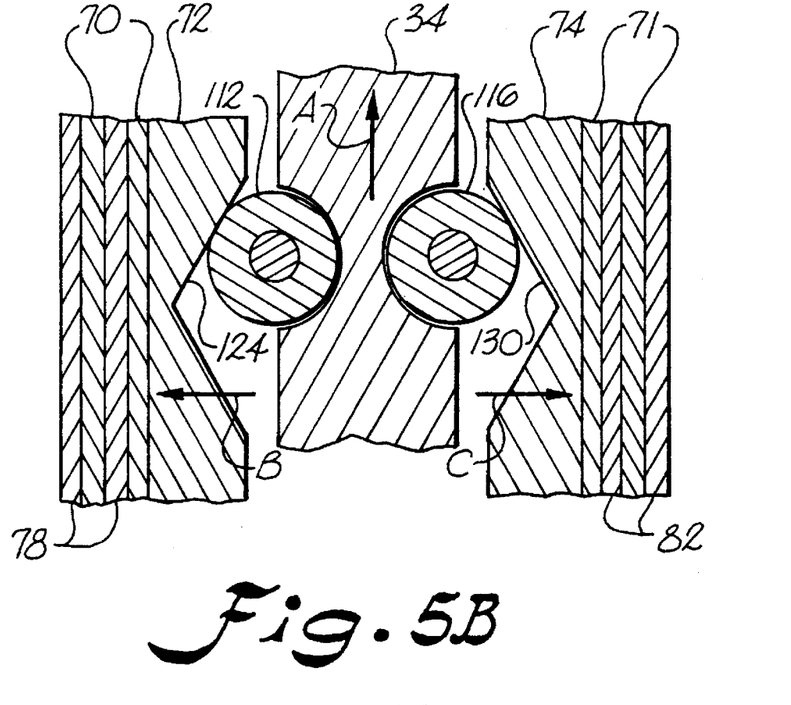
FIGS. 5B and 5C are views similar to FIG. 5A illustrating the operation of the cam mechanisms under various conditions.
Figure 5C:
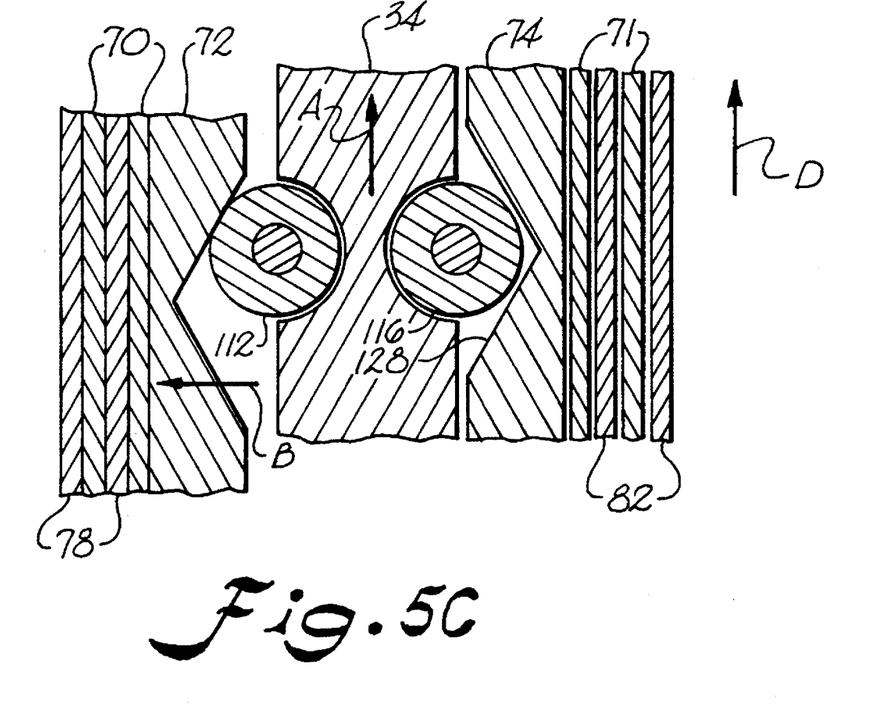

Referring now particularly to FIGS. 5A through 5C, the manner in which the described arrangement operates to selectively engage the respective clutch assemblies may be most easily explained. As can be seen, the cam indentations are preferably configured having first and second sloped surfaces which extend into the respective of auxiliary members 72 and 74 to a radial apex. For example, cam indentation 114 is defined by sloped surfaces 122 and 124, which converge at a radial apex 126. Similarly, cam indentation 118 is defined by sloping surfaces 128 and 130, which converge at radial apex 132.

The frictional plates of a particular clutch assembly will be disengaged when the roller member is fully received in its respective cam indentation. FIG. 5A illustrates the situation in which the roller members on each side of drive member 34 are in this "neutral" position. As can be seen, the frictional plates of both clutch assemblies are disengaged in this case.

As drive member 34 rotates, the roller members "ride up" one of the sloped surfaces of the associated cam indentation. As a result, the respective of auxiliary members 72 and 74 will be moved axially outward to effect engagement of the frictional plates. For example, FIG. 5B illustrates rotational movement of drive member 34 in the direction indicated by arrow A. Such movement causes roller members 112 and 116 to ride up sloped surfaces 124 and 130, respectively. The resultant outward axial movement of auxiliary members 72 and 74 is indicated by arrows B and C. It should be appreciated that both of output shafts 48 and 50 will be driven in this case, which corresponds to generally straight forward movement of vehicle 16.

FIG. 5C illustrates the manner in which clutch assembly 10 operates to allow one of the output shafts to rotate faster than drive member 34, i.e., "advance," when necessary. Specifically, in the illustrated example, an output shaft on the side having auxiliary member 74 is shown rotating relative to drive member 34, as indicated by arrow D. As a result, roller member 116 will move back to the neutral position. This disengages the frictional plates on this side of drive member 34. Accordingly, the output shaft may continue to rotate relative to drive member 34 to allow, for example, vehicle 16 to turn to the left. The output shaft on the other side of drive member 34, however, will remain engaged, as shown. When the output shafts are subsequently rotating at the same rate, the situation shown in FIG. 5B is again achieved.

It should be appreciated that continued movement of either auxiliary member 72 or 74 past the neutral position may cause the frictional plates in the associated clutch to reengage. For example, as shown in FIG. 5C, continued movement of auxiliary member 74 in the direction of arrow D may cause roller member 116 to ride up sloped surface 128. As a result, frictional plates 71 and 82 would again be engaged. As plate engagement is undesirable during shaft advancement, differential assembly 10 further includes means to limit the relative rotation between auxiliary members 72 and 74.

Figure 5D:
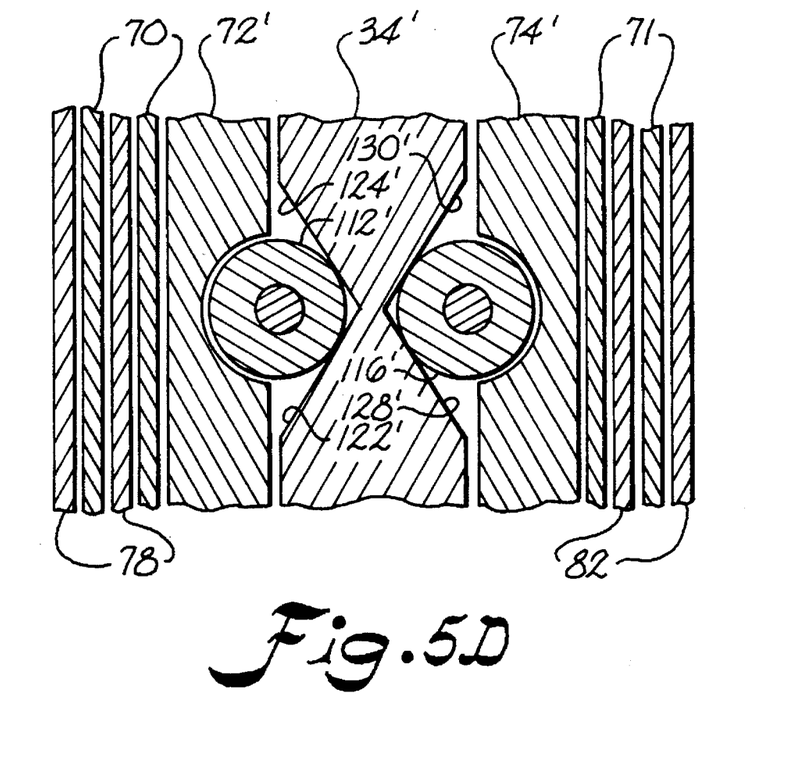
FIG. 5D is a view similar to FIG. 5A, but illustrating an alternative arrangement of the cam followers.

FIG. 5D illustrates an alternative arrangement in which a drive member 34' is provided having sloped surfaces 122' and 124' on one side and sloped surfaces 128' and 130' on the opposite side thereof. In this case, roller members 112' and 116' are carried by respective auxiliary members 72' and 74'. The operation of this alternative arrangement is similar to that described above.

Referring again to FIGS. 2 and 3, means to prevent such reengagement may include a coordinator member 134 extending through a bore defined in drive member 34. Coordinator member 134 includes respective protruding portions 136 and 138, which are received in slots, such as slot 140 of auxiliary member 72 (FIG. 3), defined in auxiliary members 72 and 74, respectively. Protruding portions 136 and 138, as well as the receiving slots, are configured to permit the slight relative rotation between auxiliary members 72 and 74 such that one clutch assembly may be engaging while the clutch assembly of the advancing shaft will be disengaged. However, rotation which could cause engagement of the clutch assembly in the opposite direction will be prevented.

As discussed above, differential assembly 10 is constructed such that both of output shafts 48 and 50 will always rotate at least as fast as drive member 34. In a typical vehicle application such as that shown in FIG. 1, this is generally desirable as it prevents a situation in which one vehicle wheel is motionless while the other spins uselessly. In some applications, however, it may be desirable that one wheel may occasionally be capable of coming to a complete stop while the other is driven. One such application is that of brake-assisted steering.

Figure 6:
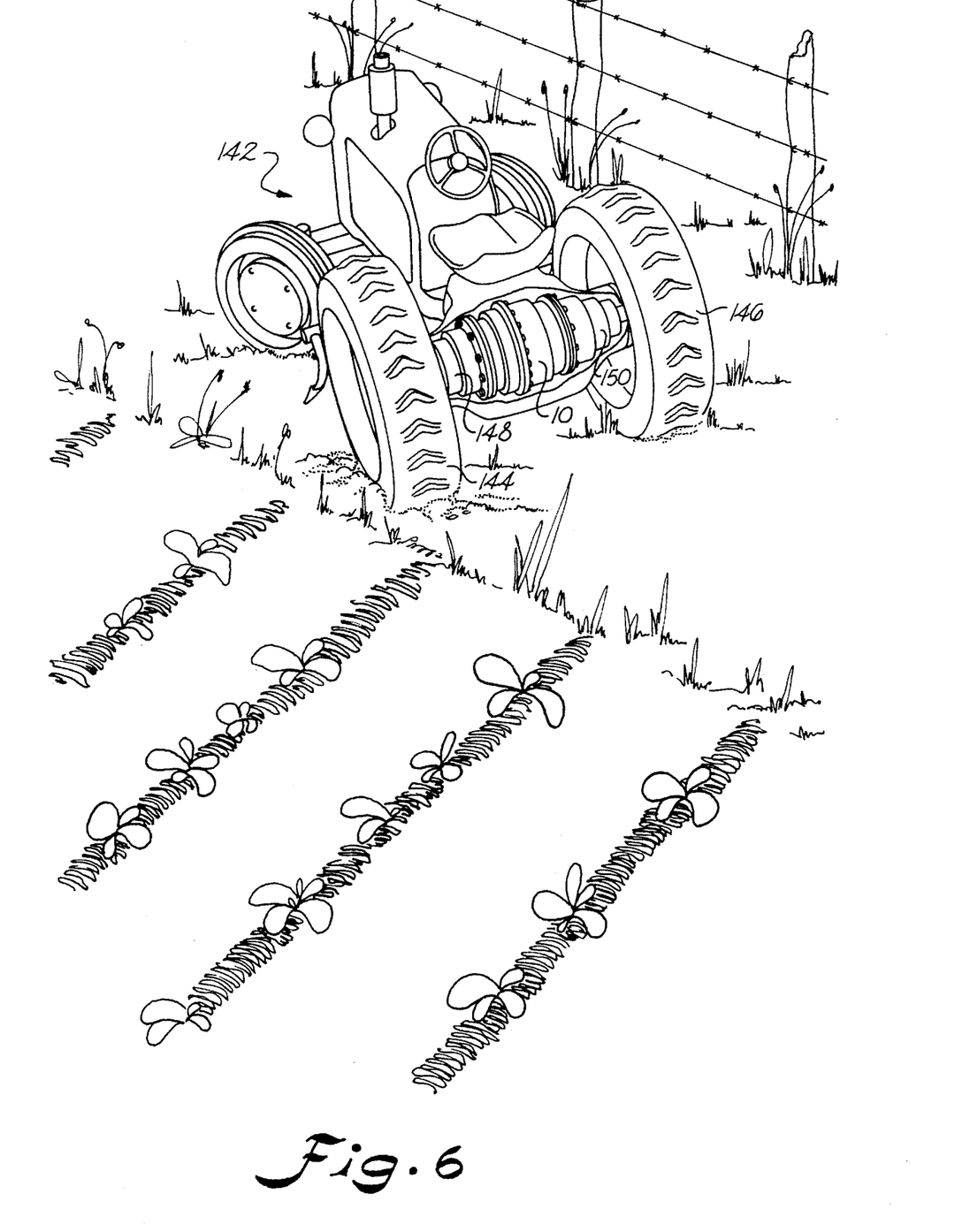
FIG. 6 is a perspective view illustrating a differential drive assembly of the present invention installed on a tractor requiring brake-assisted turning.

Referring now to FIG. 6, tractors, such as tractor 142, are often required to turn about a small turning radius. For example, tractor 142 is shown as it may appear negotiating a left turn at the end of a row of crops in order to proceed up the adjacent row. In this case, the left rear wheel 144 is braked, while the right rear wheel 146 is driven. In order to prevent the engine of tractor 142 from choking down when one of the wheels is braked, differential assembly 10 is constructed in this case further having outboard axle brake mechanisms 148 and 150. Axle brake mechanisms 148 and 150 are constructed to concurrently brake the respective of wheels 144 and 146, while simultaneously disengaging the respective output shaft of differential assembly 10 therefrom.

Figure 7:
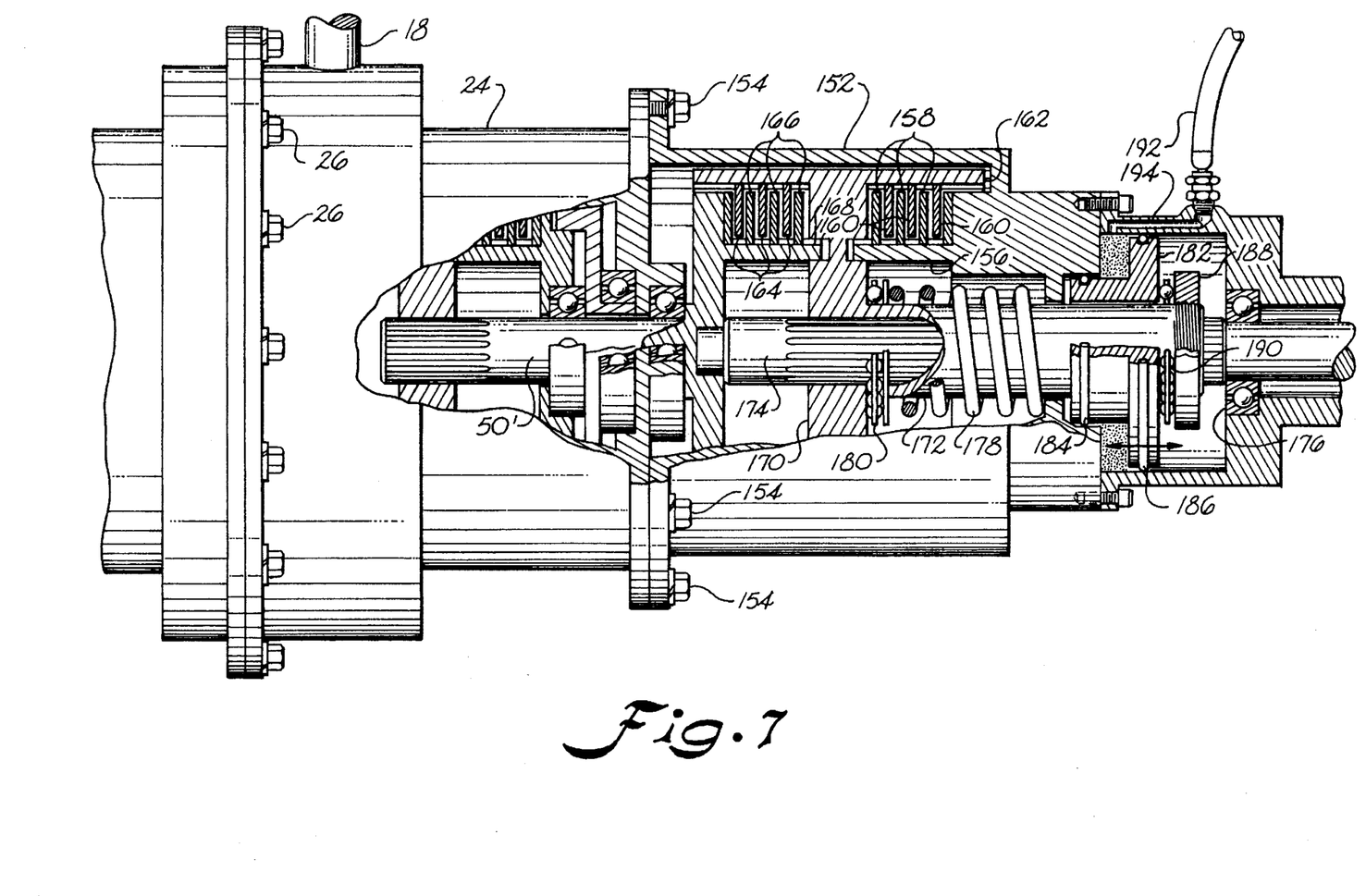
FIG. 7 is a partial cross sectional view illustrating a presently preferred axle brake mechanism for use with a differential drive assembly of the present invention in an application such as that shown in, FIG. 6.

FIG. 7 illustrates the internal construction of only axle brake mechanism 150, although it should be understood that axle brake mechanism 148 is similar in construction. As shown, axle brake mechanism 150 includes a housing portion 152 which is fixed to housing portion 24 of assembly 10 via bolts 154, or other appropriate means of attachment. Housing portion 152 includes a cylindrical plate carrier 156 extending in an inward axial direction. Plate carrier 156 maintains a plurality of frictional plates 158 in a manner similar to that described above.

Frictional plates 158 are interleaved with frictional plates 160, which are maintained by a cylindrical plate carrier 162. Plate carrier 162 further maintains frictional plates 164, which are interleaved with frictional plates 166. Frictional plates 166 are maintained by a cylindrical plate carrier 168 which is, in this case, integrally connected to a modified output shaft 50'.

Plate carrier 162 includes a radial web portion 170 which integrally extends into a longitudinal tube portion 172. As shown, tube portion 172 is mounted coaxially of an axle 174, which extends outward to the wheel. Axle 174 is received for purposes of alignment in an recess defined in the end of output shaft 50'. Axle 174 is rotatably supported with respect to the fixed housing by bearing assembly 176.

As shown, tube portion 172 extends over a portion of axle 174 having a plurality of longitudinal splines defined therein. Such splines engage complementary splines in the inner surface of tube portion 174. As a result, tube portion 172 may move axially with respect to axle 174, but relative rotational movement therebetween is prevented.

A helical spring 178 is coaxially mounted about tube portion 172 to normally urge it in the inward axial direction. It can be seen that spring 178 thus normally causes engagement of frictional plates 164 and frictional plates 166. As such, output shaft 50' and axle 178 normally rotate as a unit. Rotational wear between radial web portion 170 and helical spring 178 is prevented in this case by a thrust bearing 180.

Engagement of frictional plates 158 and frictional plates 160 will cause braking of axle 174. This is accomplished utilizing a fluid-actuated piston 182 which engages longitudinal portion 172 to cause outward axial movement of plate carrier 162. It should be appreciated that piston 182 could be constructed integrally with longitudinal portion 172 for this purpose. Preferably, however, piston 182 is configured as a separate member having an inner diameter slightly greater than the outer diameter of longitudinal portion 172. With this construction, piston 182 is not required to rotate, thus reducing rotational wear on seals 184 and 186. Piston 182 engages longitudinal portion 172 in this case through an annular ring 188 threaded on an end thereof. An interposing thrust bearing 190 may be utilized to reduce rotational wear therebetween.

As shown, piston 182 defines an annular chamber into which fluid, such as hydraulic fluid, may be introduced. Such fluid may be introduced through an appropriate hose 192 which is connected to a fluid inlet, such as that indicated at 194. Hose 192, for example, may be in fluid communication with the master cylinder of tractor 142. Thus, actuation of the respective brake pedal of tractor 142 would cause piston 182 to move in an outward axial direction against the force of spring 178. As a result, plates 164 and 166 will be disengaged, while plates 158 and 160 will be engaged. Axle 174 will thereby be disengaged from output shaft 150 while concurrently being braked.

Figure 8:
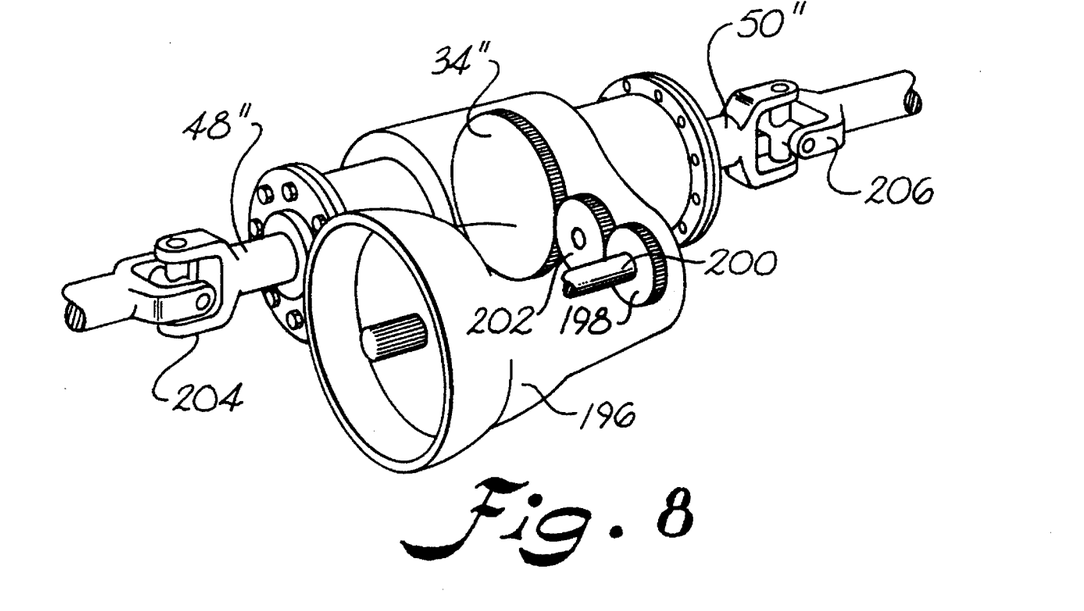
FIG. 8 is perspective view illustrating a differential drive assembly of the present invention constructed as part of the vehicle transmission and having two drive shaft outputs.

In addition to being placed between the rear wheels of a vehicle as in the case of a conventional differential, a differential assembly of the invention may be situated at other locations in the drive train to achieve desirable operating characteristics. For example, FIG. 8 illustrates an application in which a differential assembly of the invention is contained within a housing 196 also containing a vehicle transmission. For ease of explanation, only so much detail is provided in FIG. 8 as is necessary to make evident the operation of the differential assembly in this application. Reference is made to the discussion above for complete operational details.

As shown, the central drive member 34" is constructed in this case having a gear defined about its outer circumferential surface. A gear 198 is mounted to the output shaft 200 of the vehicle transmission to operatively rotate drive member 34". A transfer gear 202 may be provided interposing gear 198 and drive member 34" so that same direction rotation can be achieved.

The output shafts 48" and 50" of the differential assembly may serve as drive shafts for the front and rear axles of a vehicle, respectively. It would typically be desirable in this configuration to provide output shafts 48" and 50" with U-joints, such as those respectively indicated at 204 and 206.

The configuration illustrated in FIG. 8 permits full-time power to be delivered to the front and rear axles of the vehicle. Because differential assembly 10 allows one drive shaft to advance if necessary with respect to the other, problems of drive shaft binding are prevented. As a result, it would not be necessary to switch back to exclusive rear wheel drive or front wheel drive after the vehicle is mobilized.

It should be appreciated that drive shafts 48" and 50" may be used as inputs to typical gear-type differentials between the front and rear wheels. Alternatively, a second differential assembly 10 may receive the rotational power of shaft 48" as an input, whereas a third differential assembly 10 may receive the rotational power of shaft 50" as an input. In this case, the vehicle would be equipped with full time four-wheel drive having positive traction at each wheel.

While particular embodiments of the invention have been described and shown, it will be understood by those of ordinary skill in the art that the present invention is not limited thereto since many modifications may be made. It is therefore contemplated that the present invention cover any and all such embodiments as may fall within the literal or equivalent scope of the appended claims.

What is claimed is:

1. A differential drive assembly, said differential drive assembly comprising:

a drive member adapted to be rotatably driven by a source of input power, said drive member having respective first and second planar faces;

first and second output shafts disposed along an axis of rotation of said drive member on respective opposite sides thereof;

first and second auxiliary members each having an inner face located in opposition to a respective one of said planar faces of said drive member, said auxiliary members being rotatably and axially movable with respect to said drive member over a predetermined range;

first and second clutch assemblies each including a first plurality of first frictional plates connected to a respective of said output shafts and further including a plurality of second frictional plates connected to a respective of said auxiliary members, respective of said first frictional plates and said second frictional plates interleaved along the axis of rotation of said drive member;

first and second generally cylindrical first plate carriers connected to a respective output shaft for maintaining said plurality of first frictional plates, said first plate carriers each including a radial web portion extending axially juxtaposed to respective of said clutch assemblies;

first and second first cylindrical plate carrier portions integrally extending in an outward axial direction from a respective of said auxiliary members and maintaining said plurality of second frictional plates; and first and second cam mechanisms associated with respective of said planar faces of said drive member and a respective of said auxiliary members, each of said cam mechanisms being operative to axially move said respective of said auxiliary members such that said first frictional plates and said second frictional plates are pressed together collectively against said radial web portion and engagement of a respective of said clutch assemblies may thereby be selectively effected, whereby rotational power may be differentially transmitted from said drive member to respective of said first and second output shafts.

2. A differential drive assembly as set forth in claim 1, wherein each of said cam mechanisms comprises at least one cam follower carried by one of a respective of said drive members and said respective of said auxiliary members, said cam follower being received in an respective cam indentation defined in said one of a respective of said drive members and said respective of said auxiliary members which does not carry said cam member.

3. A differential drive assembly as set forth in claim 2, wherein said cam follower is carried by said drive member and said cam indentation is defined in said inner face of said respective of said auxiliary members.

4. A differential drive assembly as set forth in claim 3, wherein said cam follower is a radially disposed roller member rotatably carried by said drive member and said cam indentation includes first and second sloped surfaces extending into a respective of said auxiliary members to a radial apex.

5. A differential drive assembly as set forth in claim 4, further comprising a coordinator member rotatably extending through said drive member, said coordinator member interconnecting said auxiliary members to permit relative rotation therebetween only over a predetermined range.

6. A differential drive assembly as set forth in claim 4, wherein each said cam mechanism includes four (4) of said radially disposed roller members and said cam indentations.

7. A differential drive assembly as set forth in claim 1, further comprising a coordinator member rotatably extending through said drive member, said coordinator member interconnecting said auxiliary members to generally prevent relative rotation therebetween.

8. A differential drive assembly as set forth in claim 1, further comprising:

a rotatable inner differential housing fixedly secured to said drive member, said rotatable inner differential housing rotatably supporting said output shafts; and a fixed outer differential housing maintaining therein said inner differential housing, said fixed outer differential housing rotatably supporting said output shafts.

9. A differential drive assembly as set forth in claim 8, wherein said drive member includes a ring gear mounted about a circumference thereof, said ring gear engaging a drive gear operatively connected to said source of input power.

10. A differential drive assembly, said differential drive assembly comprising:

a drive member adapted to be rotatably driven by a source of input power, said drive member having respective first and second planar faces;

first and second output shafts disposed along an axis of rotation of said drive member on respective opposite sides thereof;

first and second auxiliary members each having an inner face located in opposition to a respective one of said planar faces of said drive member, said auxiliary members being rotatably and axially movable with respect to said drive member over a predetermined range;

first and second clutch assemblies each including a first plurality of first plates connected to a respective of said output shafts and further including a plurality of second plates connected to a respective of said auxiliary members, respective of said first plates and said second plates interleaved along the axis of rotation of said drive member, each said clutch assembly further comprising a second plurality of first plates and a plurality of third plates interleaved along the axis of rotation of said drive member;

first and second generally cylindrical first plate carriers connected to a respective output shaft, said first plate carriers maintaining said plurality of first plates;

first and second first cylindrical plate carrier portions integrally extending in an outward axial direction from a respective of said auxiliary members and maintaining said plurality of second plates; and first and second cam mechanisms associated with respective of said planar faces of said drive member and a respective of said auxiliary members, each of said cam mechanisms being operative to axially move said respective of said auxiliary members such that engagement of a respective of said clutch assemblies may be selectively effected, whereby rotational power may be differentially transmitted from said drive member to respective of said first and second output shafts.

11. A differential drive assembly as set forth in claim 10, further comprising first and second clutch backing members each having a second cylindrical plate carrier portion integrally extending in an inward axial direction, said plurality of third plates being maintained by said second cylindrical plate carryier portion.

12. A differential drive assembly as set forth in claim 11, further comprising a rotatable housing fixedly secured to said drive member and rotatably supporting said output shafts.

13. A differential drive assembly as set forth in claim 12, wherein one of said differential housing and each said backing member includes at least one axially projecting drive pin received in a respective drive slot defined in said one of said differential housing and each said backing member not having said drive pin.

14. A differential drive assembly as set forth in claim 13, wherein said drive slots are configured to permit rotational movement of said backing member with respect to said differential housing over a predetermined range.

15. A differential drive assembly, said differential drive assembly comprising:

a drive member adapted to be rotatably driven by a source of input power, said drive member having respective first and second planar faces;

first and second output shafts disposed along an axis of rotation of said drive member on respective opposite sides thereof;

first and second auxiliary members each having an inner face located in opposition to a respective one of said planar faces of said drive member, said auxiliary members being rotatably and axially moveable with respect to said drive member over a predetermined range;

first and second clutch assemblies each including at least one first frictional member connected to a respective of said output shafts and further including at least one second frictional member connected to a respective of said auxiliary members;

first and second cam mechanisms associated with respective of said planar faces of said drive member and a respective of said auxiliary members, each of said cam mechanisms being operative to axially move said respective of said auxiliary members such that engagement of a respective of said clutch assemblies may be selectively effected;

first and second axle brake mechanisms operative to normally provide engagement of a respective of said output shafts with an associated of first and second axles, said axle brake mechanisms being selectively actuatable to disengage said respective of said output shafts with said associated of said axles while concurrently providing braking of said associated of said axles, whereby rotational power may be differentially transmitted from said drive member to respective of said first and second output shafts.

16. A differential drive assembly as set forth in claim 15, wherein each of said axle brake mechanisms includes a fluid-actuated piston having a first carrier maintaining at least one frictional member, said first carrier mounted coaxial to said associated of said axles and selectively actuatable to provide frictional engagement between said at least one frictional member and at least one frictional member maintained by one of a second carrier connected to said respective of said output shafts and a third carrier mounted to a fixed housing.

17. A differential drive assembly as set forth in claim 16, wherein said axle brake mechanisms each include a spring for normally providing engagement of a respective of said output shafts with said associated of said axles.

18. A differential drive assembly as set forth in claim 17, wherein said spring is a helical spring mounted coaxially of said fluid-actuated piston.

* * * * *

UNITED STATES PATENT AND TRADEMARK OFFICE
CERTIFICATE OF CORRECTION

PATENT NO. : 5,540,119
DATED : July 30, 1996
INVENTOR(S) : John L. Hudson

It is certified that error appears in the above-indentified patent and that said Letters Patent is hereby corrected as shown below:

In column 12, line 55, delete "carryier" and insert therein --carrier--.

Signed and Sealed this

Twenty-sixth Day of November 1996

Attest:

BRUCE LEHMAN

Attesting Officer        Commissioner of Patents and Trademarks